UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DERIVATIVE AND PROCESS OF MAKING SAME.

No. 831,002.  Specification of Letters Patent.  Patented Sept. 11, 1906.

Application filed December 4, 1905. Serial No. 290,275. (Specimens.)

*To all whom it may concern:*

Be it known that I, MAX HENRY ISLER, chemist, a citizen of the Swiss Republic, residing at Mannheim, in the Grand Duchy of Baden, German Empire, have invented new and useful Improvements in Anthracene Derivatives and Processes of Making the Same, of which the following is a specification.

I have found that 4-halogen-1-amidoanthraquinons which are substituted in the ortho position to the amido group are converted into valuable new anthracene derivatives by treatment with a mixture of nitric acid and sulfuric acid and subsequent action of phenols, amido compounds, or their derivatives. As examples of 4-halogen-1-amidoanthraquinons which are substituted in the ortho position to the amido group I mention 4-chlor-1-amido-2-methylanthraquinon, 4.2-dihalogen-1-amidoanthraquinon, and also such compounds as contain a halogen and an amido group twice in the position 1.4 relative to one another—for instance, 1.5-diamido-2.4.6.8-tetrahalogenanthraquinon. The anthraquinon derivatives produced in this way are crystalline and are insoluble in alkalies. They can be converted by sulfonating agents—for instance, fuming sulfuric acid and boric acid—into sulfo-acids, the salts of which are soluble in water and which dye wool from the acid-bath blue shades of excellent fastness against the action of light, washing, milling, stoving, carbonizing, and steaming.

The following are examples of how my invention may be performed; but it is not limited to these examples:

Example I: Ten (10) kilos of 4-chlor-1-amido-2-methylanthraquinon are dissolved in one hundred (100) kilos of sulfuric acid of sixty-six (66) degrees Baumé in the cold and then treated also in the cold with twelve (12) kilos of nitrating acid, containing about twenty (20) to twenty-one (21) per cent. of $HNO_3$ and seventy-nine (79) to eighty (80) per cent. of $H_2SO_4$. The mass immediately becomes intense red-brown. After stirring for about from one (1) to two (2) hours ten (10) to fifteen (15) kilos of phenol are added, upon which the melt immediately becomes a beautiful deep blue, which, however, is not characteristic of the pure end product. After stirring for about two (2) to three (3) hours the whole is poured into water and the precipitate is filtered off and washed and dried. When recrystallized from twenty (20) to thirty (30) parts of napthalene, the substance forms a dark-blue mass of crystals. These crystals are insoluble in alkalies, slightly soluble in xylene, the solution being violet and somewhat more readily soluble in nitrobenzene and in anilin, the solutions being blue. The color of the solutions in concentrated sulfuric acid and monohydrate is red-violet. The solution in twenty-three (23) to seventy (70) per cent. oleum is green.

Instead of phenol other phenols or phenol derivatives—such, for instance, as resorcinol, pyrogallol, alpha- and beta-naphthol, gallic acid, and the like—or amido compounds—such, for instance, as anilin, alpha-naphthylamin, and beta-naphthylamin, 1.5-naphthylenediamin, anthranilic acid, and the like—can be employed, and for the purposes of this invention all these compounds are to be regarded as equivalents, since the phenols and amido compounds do not apparently take part in building up the molecule of the anthracene derivative.

Example II: In order to prepare the sulfo-acid coloring-matter, the following process can be employed. Ten (10) kilos of the blue coloring-matter obtained as above explained are added to from one hundred (100) to two hundred (200) kilos of fuming sulfuric acid containing, for instance, forty-five (45) per cent. of $SO_3$ and ten (10) kilos of dried boric acid and then heated for about from one (1) to two (2) hours at a temperature of one hundred (100) to one hundred and twenty (120) degrees centigrade. The melt is poured into water and the coloring-matter filtered and washed with weak common-salt solution till it is neutral. It is best used for dyeing in the form of paste. It produces strong blue shades on mordanted and unmordanted wool.

Now what I claim is—

1. The process for the production of new anthracene derivatives by treating a 4-halogen-1-amidoanthraquinon which is substituted in the ortho position to the amido group, with a mixture of nitric acid and sulfuric acid and then with a phenol.

2. The process for the production of new anthracene derivatives by treating a 4-halogen-1-amidoanthraquinon which is substituted in the ortho position to the amido group, with a mixture of nitric acid and sulfuric acid and then with a phenol and afterward sulfonating the product obtained.

3. The process for the production of a new anthracene derivative by treating 4-chlor-1-amido-2-methylanthraquinon with a mixture of nitric acid and sulfuric acid and then with phenol.

4. The process for the production of a new anthracene derivative by treating 4-chlor-1-amido-2-methylanthraquinon with a mixture of nitric acid and sulfuric acid and then with phenol and afterward sulfonating the product obtained.

5. As new articles of manufacture the new anthracene derivatives which can be obtained by treating a 4-halogen-1-amidoanthraquinon which is substituted in the ortho position to the amido group, with a mixture of nitric acid and sulfuric acid and then with a phenol, which new derivatives are crystalline and when unsulfonated are insoluble in alkalies, and which in the form of their sulfo-acids dye wool from an acid-bath blue shades.

6. As a new article of manufacture the new anthracene derivative which can be obtained by treating 4-chlor-1-amido-2-methylanthraquinon with a mixture of nitric acid and sulfuric acid and then with phenol, which new derivative consists of blue crystals which when unsulfonated are insoluble in alkalies and which in the form of its sulfo-acid dyes wool from an acid-bath blue shades.

In testimony whereof I have hereunto set my hand in the presence of two subscribing witnesses.

MAX HENRY ISLER

Witnesses:
  J. ALEC. LLOYD,
  JOS. H. LEUTE.